(12) United States Patent
Morohoshi et al.

(10) Patent No.: US 12,231,019 B2
(45) Date of Patent: Feb. 18, 2025

(54) ROTARY ELECTRICAL MACHINE

(71) Applicant: MITSUBISHI HEAVY INDUSTRIES ENGINE & TURBOCHARGER, LTD., Sagamihara (JP)

(72) Inventors: Tokio Morohoshi, Tokyo (JP); Yudai Fujioka, Tokyo (JP); Takashi Fukunaga, Tokyo (JP); Takayoshi Fujii, Tokyo (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 212 days.

(21) Appl. No.: 17/795,671

(22) PCT Filed: Mar. 4, 2021

(86) PCT No.: PCT/JP2021/008432
§ 371 (c)(1),
(2) Date: Jul. 27, 2022

(87) PCT Pub. No.: WO2021/177404
PCT Pub. Date: Sep. 10, 2021

(65) Prior Publication Data
US 2023/0077059 A1 Mar. 9, 2023

(30) Foreign Application Priority Data
Mar. 4, 2020 (JP) .................. 2020-036918

(51) Int. Cl.
*H02K 5/24* (2006.01)
*H02K 5/20* (2006.01)
(52) U.S. Cl.
CPC .............. *H02K 5/24* (2013.01); *H02K 5/203* (2021.01)

(58) Field of Classification Search
CPC ....... H02K 5/203; H02K 5/24; H02K 2213/03
See application file for complete search history.

(56) References Cited

U.S. PATENT DOCUMENTS

2016/0276895 A1* 9/2016 Aizawa .................... H02K 3/46

FOREIGN PATENT DOCUMENTS

| JP | 52-75003-1 | 8/1977 |
|---|---|---|
| JP | 2009-303367 A | 12/2009 |

(Continued)

OTHER PUBLICATIONS

WO-2015093138-A1, Aizawa, all pages (Year: 2015).*

(Continued)

*Primary Examiner* — Naishadh N Desai
(74) *Attorney, Agent, or Firm* — BIRCH, STEWART, KOLASCH & BIRCH, LLP

(57) ABSTRACT

A rotary electrical machine includes a rotor, a stator, and a housing having a flow passage section. The flow passage section has an inner circumferential wall that makes contact with an outer circumferential surface of the stator, an outer circumferential wall arranged on the outside of the inner circumferential wall in the radial direction, and a partition wall section, which is provided in a portion in the circumferential direction, and connects the inner circumferential wall and the outer circumferential wall in the radial direction. The stator has a yoke section extending in the circumferential direction, and a plurality of teeth extending radially inward from the yoke section. The yoke section has a first portion connected to each of the teeth, and a second portion arranged between two first portions adjacent to each other in the circumferential direction. The partition wall section faces the second portion in the radial direction.

4 Claims, 5 Drawing Sheets

(56) References Cited

FOREIGN PATENT DOCUMENTS

| JP | 52-35453 | B2 | | 7/2013 | |
|----|----------|----|----|--------|---|
| JP | 2014-236613 | A | | 12/2014 | |
| JP | 2018-46853 | A | | 4/2016 | |
| JP | 2017-127118 | A | | 7/2017 | |
| JP | 2018157644 | A | * | 10/2018 | |
| WO | WO-2015093138 | A1 | * | 6/2015 | ............ H02K 11/33 |
| WO | WO 2018/158154 | A1 | | 10/2016 | |

OTHER PUBLICATIONS

JP-2018157644-A, Kume, all pages (Year: 2018).*
Japanese Office Action for Japanese Application No. 2020-036918, dated Jan. 30, 2024, with English translation.
International Search Report for International Application No. PCT/JP2021/008432, dated May 11, 2021.
Written Opinion of the International Searching Authority for International Application No. PCT/JP2021/008432, dated May 11, 2021 with an English translation.

* cited by examiner (a)

(b)

ROTARY ELECTRICAL MACHINE

TECHNICAL FIELD

The present invention relates to a rotary electrical machine.

BACKGROUND ART

Each of rotary electrical machines disclosed in PTLs 1 and 2 includes a rotor, a stator that is disposed outside the rotor in a radial direction, and a housing in which the stator is housed. The stator includes a tubular yoke portion and teeth that extend inward from the yoke portion in a radial direction. The rotary electrical machines are adapted to generate a rotating magnetic field in a case where current flows through coils wound around the teeth and to rotate the rotor via a magnetic force generated by the rotating magnetic field.

A refrigerant flow passage through which a refrigerant for cooling the stator and the like flows is formed in the housing. The housing includes, as components forming the refrigerant flow passage, an inner peripheral wall that is in contact with an outer peripheral surface of the stator, an outer peripheral wall that is disposed outside the inner peripheral wall in the radial direction, and a partition wall portion that is disposed between the inner peripheral wall and the outer peripheral wall in the radial direction. The partition wall portion is provided at a part of the housing in a circumferential direction and connects the inner peripheral wall to the outer peripheral wall. An inlet of the refrigerant flow passage is formed in the vicinity of the partition wall portion, and an outlet of the refrigerant flow passage is formed on a side opposite to the inlet with the partition wall portion interposed between the inlet and the outlet. A refrigerant having flowed into the refrigerant flow passage through the inlet flows almost completely around along the refrigerant flow passage and then flows out of the outlet.

CITATION LIST

Patent Literature

[PTL 1] Japanese Unexamined Patent Application Publication No. 2016-46853
[PTL 2] Japanese Unexamined Patent Application Publication No. 2014-236613

SUMMARY OF INVENTION

Technical Problem

A magnetic force intermittently acts between the rotor and the teeth during the rotation of the rotor in the above-mentioned rotary electrical machines, causing the stator to vibrate. In a case where such vibration is transmitted to the inner peripheral wall from the stator and is further transmitted to the outer peripheral wall from the inner peripheral wall through, for example, the partition wall portion, the outer peripheral wall is vibrated and noise may be generated. A method of suppressing the transmission of vibration from the inner peripheral wall to the outer peripheral wall without providing the partition wall portion is conceivable as one of the measures against noise. However, in this case, there is a concern that a discontinuous passage will be formed to the outlet from the inlet and that a large amount of refrigerant will likely flow into the discontinuous passage. For this reason, there may be a problem in that the amount of refrigerant flowing through the refrigerant flow passage in the related art is significantly reduced and that a cooling function significantly deteriorates.

An object of the present invention is to suppress the transmission of the vibration of a stator to an outer peripheral wall even in a case where an inner peripheral wall and an outer peripheral wall of a housing are connected to each other by a partition wall portion.

Solution to Problem

A rotary electrical machine according to a first invention includes a rotor that is rotatable using a predetermined axial direction as a direction of an axis of rotation, a stator that is disposed outside the rotor in a radial direction of the rotor, and a housing which includes a flow passage portion in which a refrigerant flow passage through which a refrigerant flows is formed and which houses the rotor and the stator; the flow passage portion includes an inner peripheral wall that is in contact with an outer peripheral surface of the stator, an outer peripheral wall that is disposed outside the inner peripheral wall in the radial direction and that is provided to form the refrigerant flow passage between the outer peripheral wall and the inner peripheral wall, and a partition wall portion that is provided at a part in a circumferential direction orthogonal to both the axial direction and the radial direction and that connects the inner peripheral wall to the outer peripheral wall in the radial direction; the stator includes a tubular yoke portion and a plurality of teeth which are arranged side by side in the circumferential direction and which extend inward from the yoke portion in the radial direction; the yoke portion includes first portions that are connected to the respective teeth and second portions which are each disposed between the two first portions adjacent to each other in the circumferential direction; and the partition wall portion faces the second portion in the radial direction.

The second portion of the yoke portion is a portion disposed between the first portions that are adjacent to each other in the circumferential direction. In other words, the second portion is a portion that is thinner than a portion of the stator, at which the tooth and the first portion are connected to each other, in the radial direction. That is, bending stiffness is low at the second portion. In the present invention, the partition wall portion faces the second portion in the radial direction. In other words, the second portion is interposed between the teeth and the partition wall portion. In a case where the stator is vibrated due to the operation of the rotary electrical machine in such a configuration, the second portion is deformed and functions as a weak spring element, so that the transmission of the vibration of the stator to the inner peripheral wall of the housing can be suppressed. Accordingly, the transmission of vibration to the outer peripheral wall of the housing through the partition wall portion can be suppressed. Therefore, even in a case where the inner peripheral wall and the outer peripheral wall of the housing are connected to each other by the partition wall portion, the transmission of the vibration of the stator to the outer peripheral wall can be suppressed.

According to a second invention, in the rotary electrical machine according to the first invention, the partition wall portion and a center of the second portion in the circumferential direction face each other in the radial direction.

Since the central portion of the second portion in the circumferential direction is farthest from the positions at which the teeth are provided, the central portion of the second portion in the circumferential direction has the lowest stiffness and is most likely to be deformed. For this reason, particularly, in a case where the partition wall portion faces the central portion in the radial direction, an anti-vibration function obtained from the second portion can be most effectively exhibited. Accordingly, the transmission of vibration to the outer peripheral wall through the partition wall portion can be effectively suppressed.

DESCRIPTION OF EMBODIMENTS

Next, an embodiment of the present invention will be described. A direction perpendicular to the plane of paper in FIG. 1 (a vertical direction of the plane of paper in FIGS. 2(a) and 2(b)) is defined as an axial direction. A radial direction of a rotor 11 (to be described later), which is a direction orthogonal to the axial direction, will be hereinafter simply referred to as a radial direction. A direction orthogonal to both the axial direction and the radial direction is referred to as a circumferential direction.

(Rotary Electrical Machine)

Figure 1:
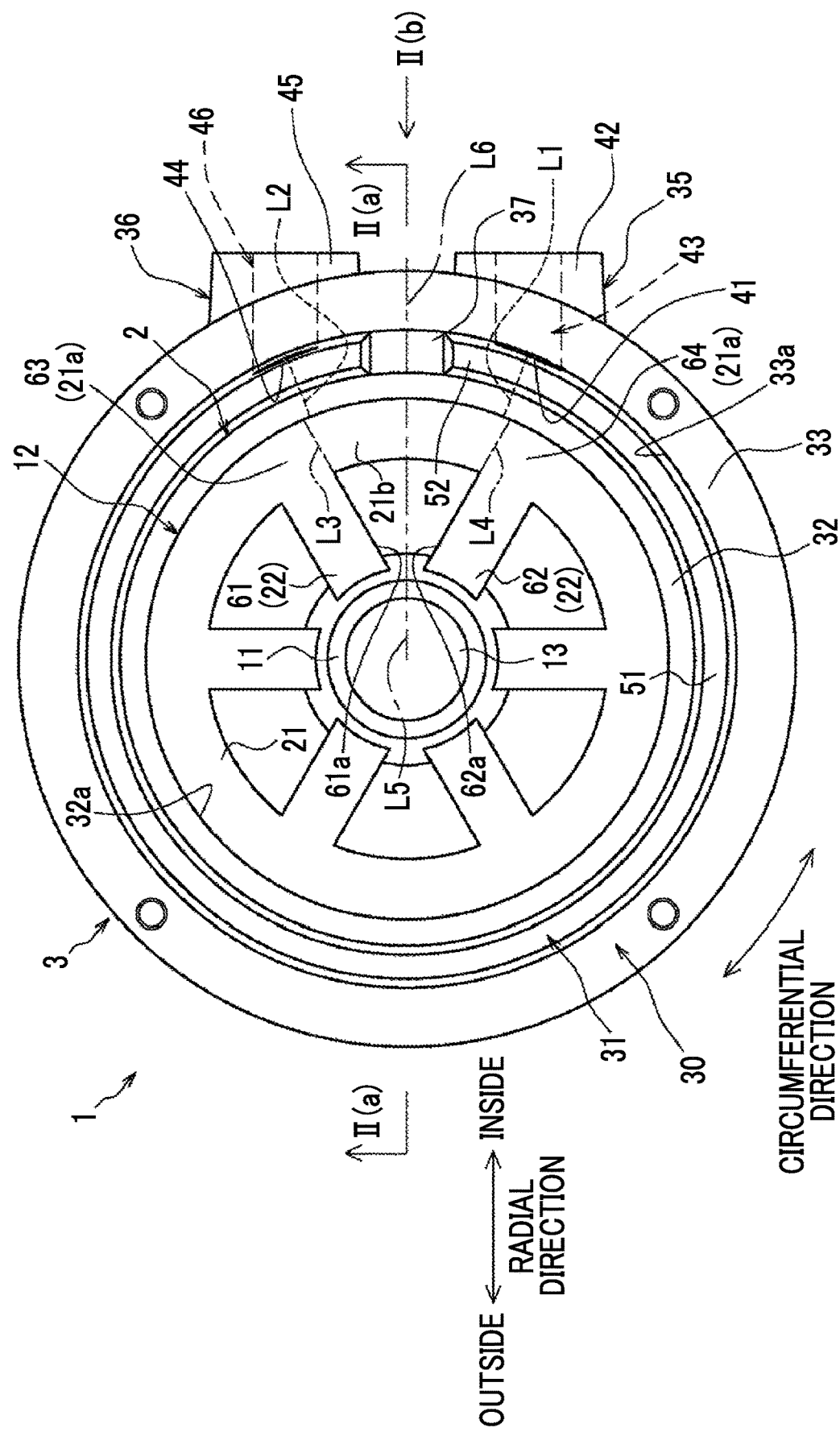
FIG. 1 is a plan view of a rotary electrical machine according to Example 1 of an embodiment.
Figure 2:
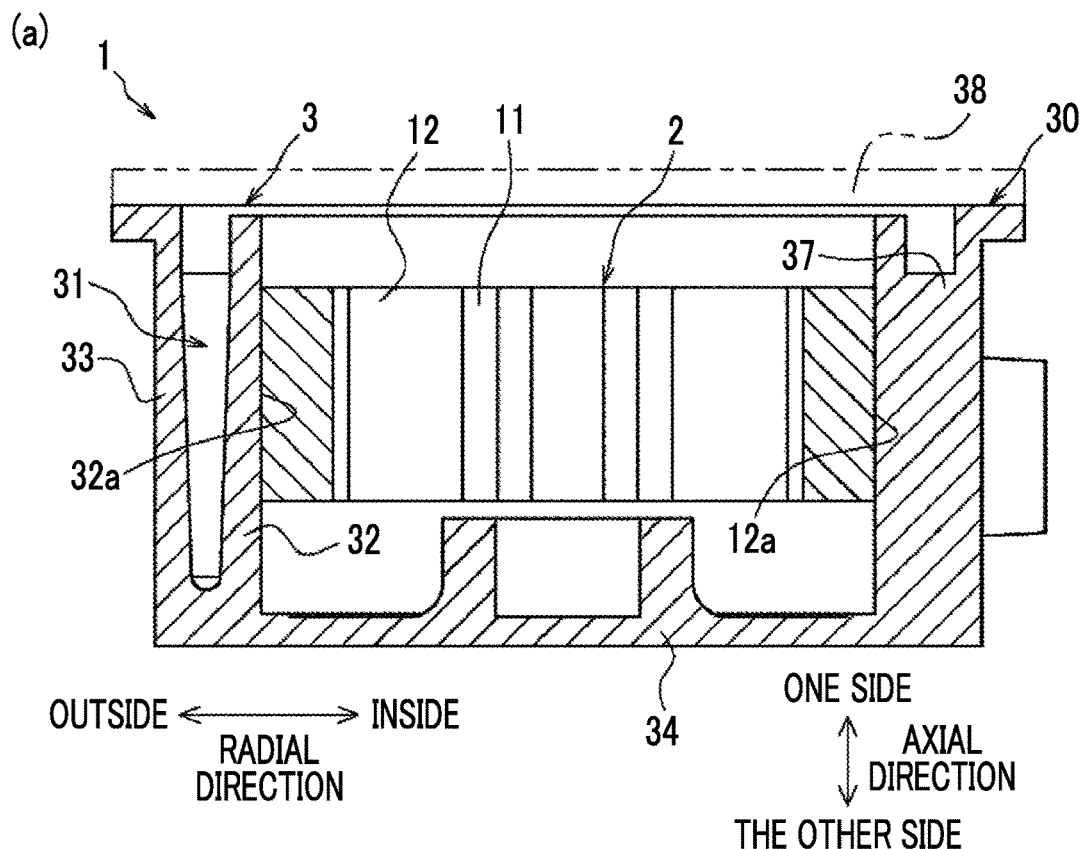
FIG. 2(a) is a cross-sectional view taken along line II(a)-II(a) of FIG. 1.
FIG. 2(b) is a diagram viewed in the direction of an arrow II(b) of FIG. 1.
Figure 2:
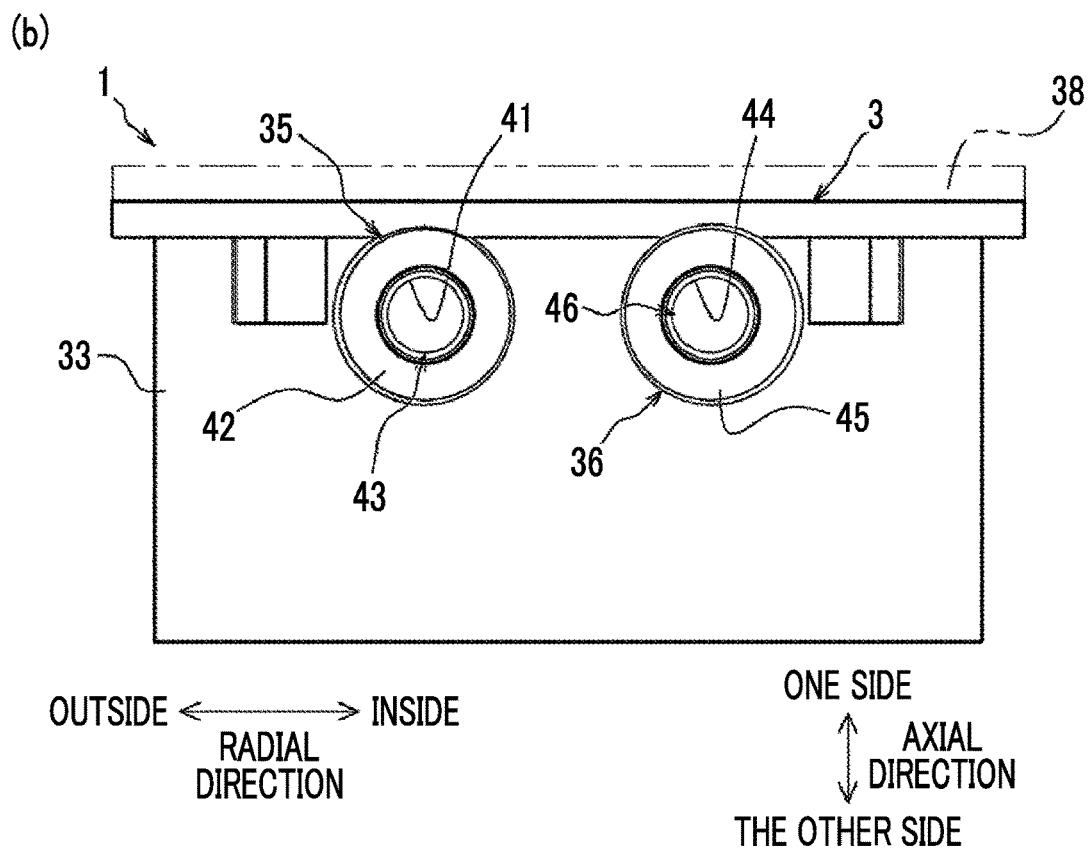

First, the configuration of a rotary electrical machine 1 according to this embodiment will be described with reference to FIG. 1 and FIGS. 2(a) and 2(b). FIG. 1 is a plan view of the rotary electrical machine 1. FIG. 2(a) is a cross-sectional view taken along line II(a)-II(a) of FIG. 1. FIG. 2(b) is a diagram viewed in the direction of an arrow II(b) of FIG. 1.

As shown in FIG. 1, the rotary electrical machine 1 includes a motor 2 and a housing 3. The motor 2 is, for example, a publicly known AC motor. The motor 2 includes a rotor 11 that is rotatable using the above-mentioned axial direction as the direction of the axis of rotation and a stator 12 that is disposed outside the rotor 11 in the radial direction. The motor 2 is adapted so that the rotor 11 is rotated by a rotating magnetic field that is generated in a case where alternating current flows through coils (not shown) wound around the stator 12.

The rotor 11 is, for example, a substantially cylindrical member that includes a permanent magnet (not shown). The rotor 11 is disposed inside the stator 12 in the radial direction. A rotating shaft 13 is fitted to the rotor 11. The configuration of the rotor 11 is not limited thereto. For example, the rotor 11 may include a plurality of salient poles that protrude in a direction orthogonal to the direction of the axis of rotation (that is, the motor 2 may be, for example, a switched reluctance motor). The stator 12 is a substantially tubular member that is formed of a magnetic member made of, for example, carbon steel or the like. The stator 12 is disposed outside the rotor 11 in the radial direction. The stator 12 is fitted to the housing 3. The stator 12 includes a substantially cylindrical yoke portion 21 that is formed over the entire circumference in the circumferential direction and a plurality of teeth 22 which each extend inward in the radial direction from a part of the yoke portion 21 in the circumferential direction. In other words, the yoke portion 21 and the teeth 22 are integrally provided, and a part of the yoke portion 21 in the circumferential direction is connected to each of the teeth 22. In this embodiment, six teeth 22 are arranged at substantially regular intervals in the circumferential direction. The yoke portion 21 includes portions (first portions 21a) that are connected to the respective teeth 22 and portions (second portions 21b) which are each disposed between the first portions 21a adjacent to each other in the circumferential direction. The second portion 21b is a portion that is thinner than a portion of the stator 12, at which the first portion 21a and the tooth 22 are connected to each other, in the radial direction. In this embodiment, six second portions 21b are formed. In this embodiment, the sizes of all the second portions 21b in the circumferential direction are substantially equal to each other, and the sizes of all the second portions 21b in the radial direction are substantially equal to each other.

The coil (not shown) is wound around each of the teeth 22. The coils are electrically connected to a power supply (not shown). The power supply supplies power, which causes alternating current to flow through the coils, to the motor 2. More specifically, the power supply supplies power so that alternating current having the same phase flows through a pair of coils wound around a pair of teeth 22 positioned on sides opposite to each other with the rotor 11 interposed therebetween among the six teeth 22. In this embodiment, the power supply supplies power so that three types of alternating current having phases different from each other by 120° flow through three pairs of coils, respectively (general three-phase alternating current).

In a case where the above-mentioned power is supplied to the coils in such a motor 2, a rotating magnetic field rotating in the circumferential direction in a predetermined cycle is generated and a magnetic force is generated between magnetic poles of the rotating magnetic field and the rotor 11. Accordingly, the rotor 11 is rotated together with the rotating shaft 13 so as to follow the rotating magnetic field.

The housing 3 is a case member that is opened on one side thereof in the axial direction and houses the motor 2. The housing 3 is formed of, for example, a die casting that is formed by a general die casting method and is made of an aluminum alloy. The material of the housing 3 does not necessarily need to be an aluminum alloy. For example, the housing 3 may be made of metal, such as iron, or may be formed of a member other than metal. Further, the housing 3 does not necessarily need to be formed by a die casting method and may be formed by another publicly known casting method or the like. The housing 3 includes a flow passage portion 30 in which a refrigerant flow passage 31 through which a refrigerant for cooling the motor 2 flows is formed. As shown in FIG. 1 and FIGS. 2(a) and 2(b), the flow passage portion 30 includes an inner peripheral wall 32, an outer peripheral wall 33, a bottom portion 34, an inlet portion 35, an outlet portion 36, and a partition wall portion 37.

The inner peripheral wall 32 extends in the axial direction and is formed over the entire circumference in the circumferential direction. An inner peripheral surface 32a of the inner peripheral wall 32 is in contact with an outer peripheral surface 12a of the stator 12. In this way, the stator 12 is fitted to the inner peripheral wall 32 of the housing 3. Like the inner peripheral wall 32, the outer peripheral wall 33 extends in the axial direction and is formed over the entire circumference in the circumferential direction. The outer peripheral wall 33 is disposed outside the inner peripheral wall 32 in the radial direction, and is disposed side by side with the inner peripheral wall 32 in the radial direction. The outer peripheral wall 33 is provided so that a gap having a predetermined size is formed between the inner peripheral wall 32 and the outer peripheral wall 33 in the radial direction. For example, the size of the gap is substantially constant in the circumferential direction. The bottom portion 34 is provided on the other end portion of the housing 3 in the axial direction, and connects the inner peripheral wall 32 to the outer peripheral wall 33 in the radial direction. The refrigerant flow passage 31 having a substantially U-shaped cross-section (see FIG. 2(a)) is formed by the inner peripheral wall 32, the outer peripheral wall 33, and the bottom portion 34 to extend in the circumferential direction. In other words, the refrigerant flow passage 31 is formed between the inner peripheral wall 32 and the outer peripheral wall 33.

The inlet portion 35 is a portion at which an inlet 41 used to supply a refrigerant to the refrigerant flow passage 31 is formed. As shown in FIG. 1, the inlet 41 is opened to an inner peripheral surface 33a of the outer peripheral wall 33 at a predetermined position in the circumferential direction. Further, the outer peripheral wall 33 is provided with a supply pipe portion 42 that protrudes outward in the radial direction. A through-hole (supply flow passage 43) including the inlet 41 is formed from the tip of the supply pipe portion 42 to the inner peripheral surface 33a of the outer peripheral wall 33. The supply flow passage 43 is connected to the refrigerant flow passage 31 through the inlet 41. The supply flow passage 43 extends in a direction substantially orthogonal to the axial direction in this embodiment, but is not limited thereto.

The outlet portion 36 is a portion at which an outlet 44 used to discharge a refrigerant from the refrigerant flow passage 31 is formed. Like the inlet 41, the outlet 44 is opened to the inner peripheral surface 33a of the outer peripheral wall 33. The position of the outlet 44 in the circumferential direction is different from the position of the inlet 41 in the circumferential direction (the above-mentioned predetermined position). Further, the outer peripheral wall 33 is provided with a discharge pipe portion 45 that protrudes outward in the radial direction. A through-hole (exhaust flow passage 46) including the outlet 44 is formed from the inner peripheral surface 33a of the outer peripheral wall 33 to the tip of the discharge pipe portion 45. The exhaust flow passage 46 is connected to the refrigerant flow passage 31 through the outlet 44. In this embodiment, as viewed in the axial direction, the inlet portion 35 and the outlet portion 36 are disposed with the partition wall portion 37 interposed therebetween to be substantially symmetric with respect to a line (see FIG. 1). Further, the supply flow passage 43 and the exhaust flow passage 46 are disposed substantially in parallel to each other, but are not limited thereto.

As shown in FIG. 1, the refrigerant flow passage 31 is broadly divided into two portions by, for example, an imaginary straight line L1 that extends in the radial direction and that passes through the center of the inlet 41 and an imaginary straight line L2 that extends in the radial direction and that passes through the center of the outlet 44. That is, the refrigerant flow passage 31 is divided into a first flow passage 51 of which the length from the inlet 41 to the outlet 44 in the circumferential direction is a predetermined length and a second flow passage 52 of which the length from the inlet 41 to the outlet 44 in the circumferential direction is shorter than the predetermined length. The first flow passage 51 occupies substantially the entire circumference of the refrigerant flow passage 31. In this embodiment, the width of the first flow passage 51 in the radial direction is substantially constant in the circumferential direction. The second flow passage 52 is a remaining portion of the refrigerant flow passage 31 that excludes the first flow passage 51.

The partition wall portion 37 is made to suppress the outflow of a refrigerant, which flows into the refrigerant flow passage 31 through the inlet 41, from the outlet 44 through the short second flow passage 52. As shown in FIG. 1, the partition wall portion 37 is provided in a part (in the middle of the second flow passage 52) in the circumferential direction, and is disposed between the inner peripheral wall 32 and the outer peripheral wall 33 in the radial direction. The partition wall portion 37 is formed integrally with the inner peripheral wall 32 and the outer peripheral wall 33 and extends in the axial direction (see FIG. 2(a)). The partition wall portion 37 connects the inner peripheral wall 32 to the outer peripheral wall 33. That is, the second flow passage 52 is divided into two portions by the partition wall portion 37. Accordingly, in a case where a refrigerant, which flows into the refrigerant flow passage 31 through the inlet 41, flows toward the second flow passage 52, the partition wall portion 37 can prevent the refrigerant as it is from reaching the outlet 44. The partition wall portion 37 may be provided as a member separate from the inner peripheral wall 32 and the outer peripheral wall 33.

Further, for example, a substantially disc-like lid member 38 is fixed to one end portion of the housing 3 in the axial direction by a fixture (not shown). Accordingly, the refrigerant flow passage 31 is sealed except for the inlet 41 and the outlet 44.

In the above-mentioned refrigerant flow passage 31, most of a refrigerant, which flows in through the inlet 41, flows into the first flow passage 51, flows through the first flow passage 51 over substantially the entire circumference in the circumferential direction, and flows out through the outlet 44. Since the refrigerant flows in this way, the housing 3 is cooled by the refrigerant and the motor 2 in contact with the housing 3 is further cooled by thermal conduction.

Here, in a case where the rotor 11 is rotating, a magnetic force intermittently acts between the teeth 22 of the stator 12 and the rotor 11. Accordingly, the teeth 22 vibrate, and the vibration is transmitted to the entire stator 12. In a case where such vibration is transmitted to the inner peripheral wall 32 from the stator 12 and is further transmitted to the outer peripheral wall 33 from the inner peripheral wall 32 through, for example, the partition wall portion 37, the outer peripheral wall 33 is vibrated and noise may be generated. A method of suppressing the transmission of vibration from the inner peripheral wall 32 to the outer peripheral wall 33 without providing the partition wall portion 37 is conceivable as one of the measures against noise. However, in this case, there is a concern that the second flow passage 52 will be discontinued between the inlet 41 and the outlet 44 and a large amount of refrigerant will likely flow into the second flow passage 52. For this reason, there may be a problem in that the amount of refrigerant flowing through the first flow passage 51 is significantly reduced and that a cooling function significantly deteriorates.

Accordingly, the present inventor focused on a positional relationship between the stator 12 and the partition wall portion 37 in order to suppress the transmission of the vibration of the stator 12 to the outer peripheral wall 33 of the housing 3 even in a case where the inner peripheral wall 32 and the outer peripheral wall 33 are connected to each other by the partition wall portion 37. Specifically, the present inventor focused on a relationship between the position of each second portion 21b of the yoke portion 21 of the stator 12 in the circumferential direction and the position of the partition wall portion 37 in the circumferential direction. As described above, the second portion 21b is a portion of the yoke portion 21 disposed between two first portions 21a that are adjacent to each other in the circumferential direction (see first portions 63 and 64 connected to teeth 61 and 62 of FIG. 1, respectively). In more detail, for example, a portion of an outer edge of the tooth 61, which extends substantially in the radial direction and is closer to the tooth 62 in the circumferential direction, as viewed in the axial direction is defined as an outer edge 61a. Further, a portion of an outer edge of the tooth 62, which extends substantially in the radial direction and is closer to the tooth 61 in the circumferential direction, as viewed in the axial direction is defined as an outer edge 62a. The second portion 21b is, for example, a portion of the yoke portion 21 interposed between an extension line L3 of the outer edge 61a and an extension line L4 of an outer edge 62a of the tooth 62. A positional relationship between the second portion 21b and the partition wall portion 37 in Examples 1 and 2 and a comparative example to be described later will be described below.

Example 1

A positional relationship between the second portion 21b of the stator 12 and the partition wall portion 37 in the circumferential direction in a rotary electrical machine 1 of Example 1 will be described with reference to FIG. 1. In Example 1, the partition wall portion 37 is inside the second portion 21b in the circumferential direction. In other words, the partition wall portion 37 faces the second portion 21b in the radial direction. In other words, the second portion 21b is interposed between the partition wall portion 37 and the teeth 22 that are vibrated by an intermittent magnetic force during the operation of the motor 2.

In more detail, the partition wall portion 37 and the center of the second portion 21b in the circumferential direction (see a straight line L5 of FIG. 1) face each other in the radial direction. In other words, the center of the second portion 21b in the circumferential direction is inside the partition wall portion 37 in the circumferential direction. More strictly speaking, the position of the center of the second portion 21b in the circumferential direction and the position of the center of the partition wall portion 37 in the circumferential direction (see a straight line L6 of FIG. 1) coincide with each other.

The present inventor thought that the transmission of the vibration of the stator 12 to the outer peripheral wall 33 of the housing 3 could be suppressed by the following principle in a case where such a configuration was applied. That is, in a case where the stator 12 is vibrated, the second portion 21b thin in the radial direction is deformed and functions as a weak spring element, so that the transmission of the vibration of the stator 12 to the inner peripheral wall 32 of the housing 3 is suppressed. Accordingly, the transmission of vibration to the outer peripheral wall 33 of the housing 3 through the partition wall portion 37 is suppressed. In this way, an anti-vibration function is exhibited by the second portion 21b. In addition, since the central portion of the second portion 21b in the circumferential direction is farthest from the positions at which the teeth 22 are provided, the central portion of the second portion 21b in the circumferential direction has the lowest stiffness and is most likely to be deformed. For this reason, in a case where the partition wall portion 37 faces the central portion in the radial direction, an anti-vibration function obtained from the second portion 21b is most effectively exhibited.

Example 2

Figure 3:
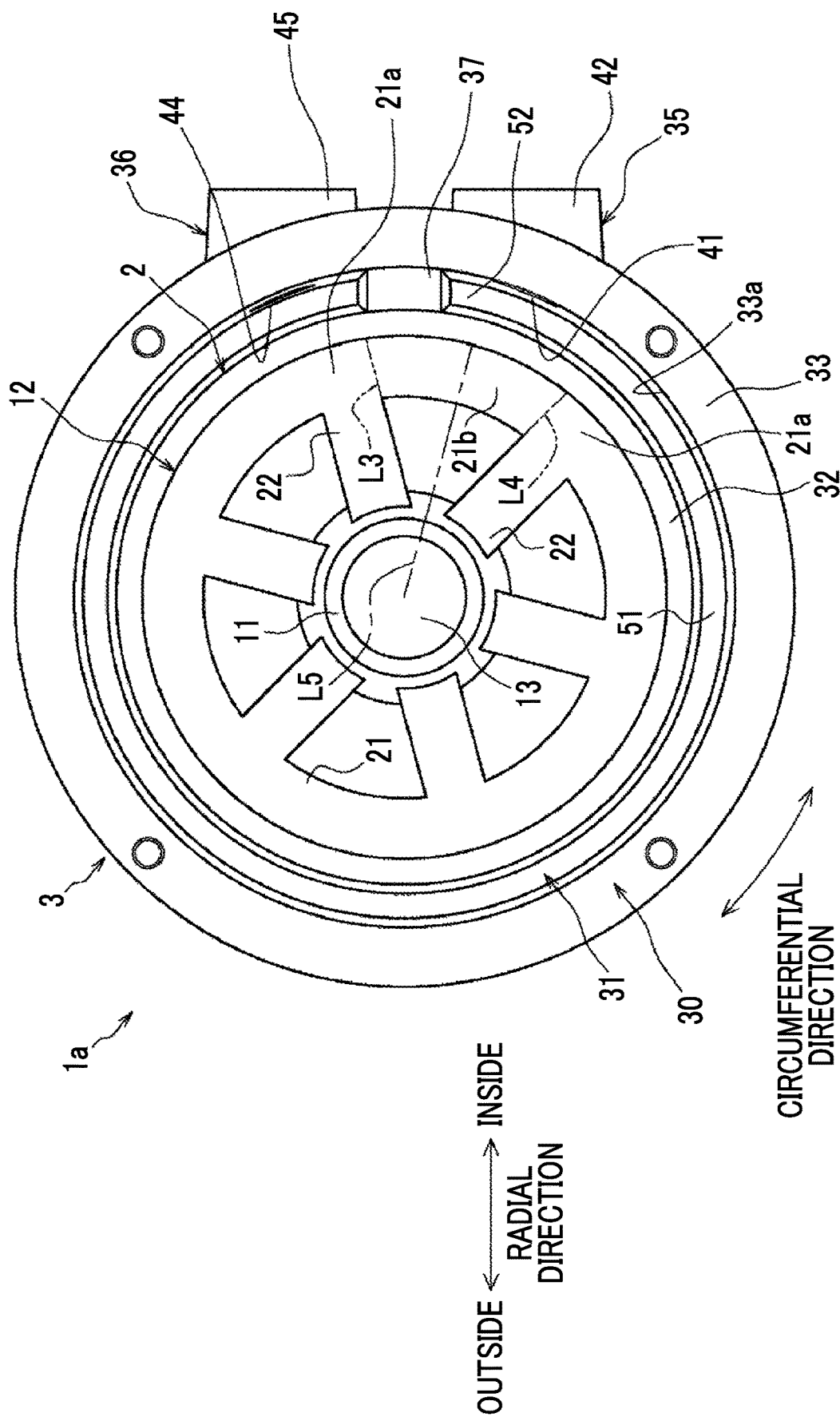
FIG. 3 is a plan view of a rotary electrical machine according to Example 2.

A positional relationship between the second portion 21b of the stator 12 and the partition wall portion 37 in the circumferential direction in a rotary electrical machine 1a of Example 2 will be described with reference to FIG. 3. A common point between Example 1 and Example 2 is that the partition wall portion 37 faces the second portion 21b in the radial direction. On the other hand, a difference between Example 1 and Example 2 is that the partition wall portion 37 does not face the center of the second portion 21b in the circumferential direction (see a straight line L5 of FIG. 3). Specifically, in Example 2, the center of the second portion 21b in the circumferential direction and the center of the partition wall portion 37 in the circumferential direction are shifted from each other by 15°. The present inventor thought that the transmission of vibration to the inner peripheral wall 32 of the housing 3 was suppressed to some extent since the second portion 21b was deformed during the vibration of the stator 12 even in such a configuration.

Comparative Example

Figure 4:
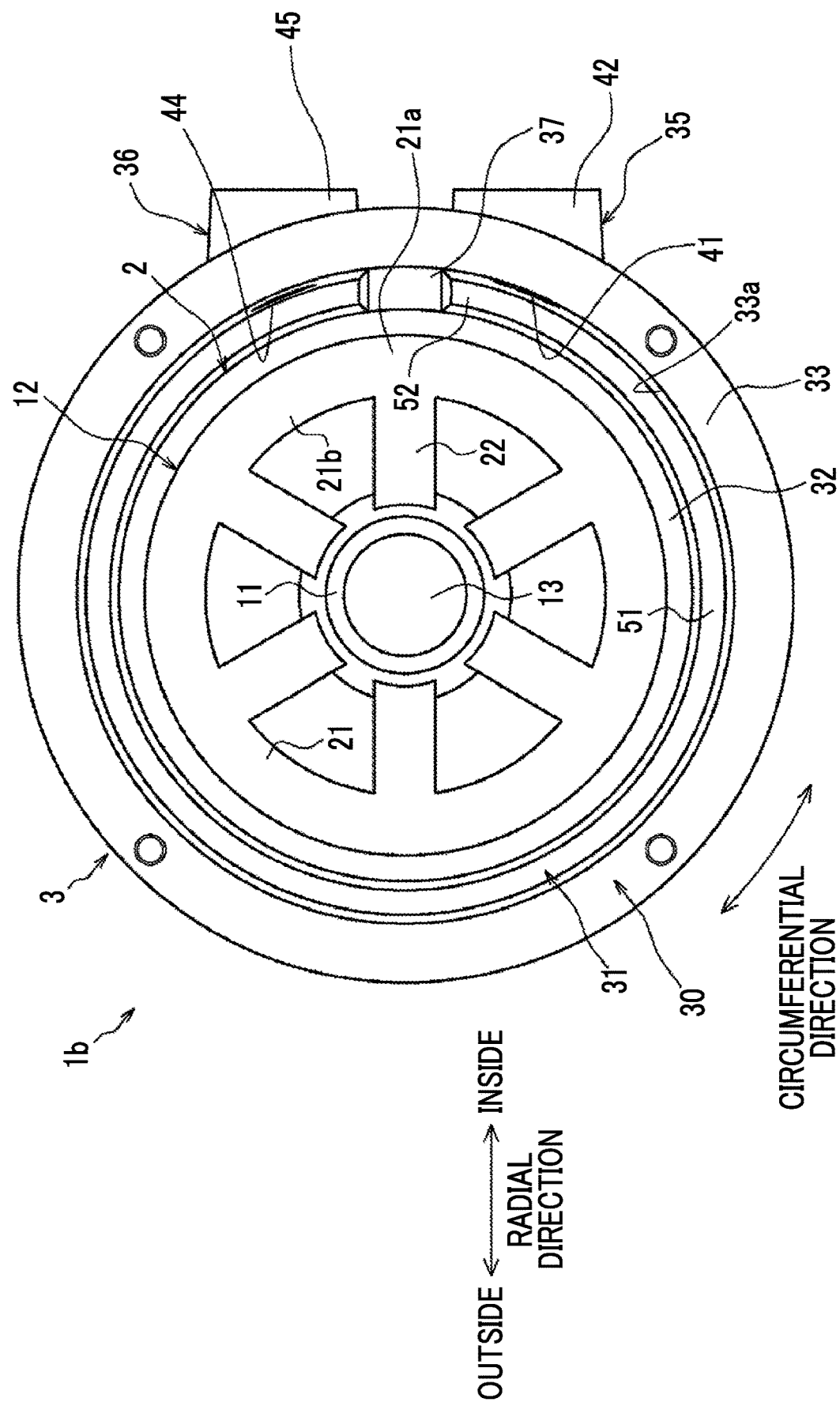
FIG. 4 is a plan view of a rotary electrical machine according to a comparative example.

A positional relationship between the second portion 21b of the stator 12 and the partition wall portion 37 in the circumferential direction in a rotary electrical machine 1b of a comparative example will be described with reference to FIG. 4. In the comparative example, the partition wall portion 37 does not face the second portion 21b in the radial direction. The partition wall portion 37 faces the first portion 21a of the yoke portion 21 in the radial direction. In such a configuration, the vibration of the tooth 22 is transmitted to the inner peripheral wall 32 without passing through the second portion 21b and is further transmitted to the outer peripheral wall 33 through the partition wall portion 37. For this reason, the present inventor thought that the outer peripheral wall 33 would vibrate significantly.

(Analysis of Vibration Amplitude of Outer Peripheral Wall)

The present inventor analyzed the magnitude of the vibration of the outer peripheral wall 33 in Examples 1 and 2 and the comparative example described above via simulation. Analysis conditions (for example, the size of the tooth 22, the size of the partition wall portion 37, and the amplitude and frequency of current flowing through the coils) other than a positional relationship between the second portion 21b and the partition wall portion 37 in the circumferential direction are common to Examples 1 and 2 and the comparative example. Moreover, the present inventor simulated the strain of the stator 12 and the strain of the housing 3 with regard to Examples 1 and 2 and the comparative example. In addition, the present inventor calculated the frequency components of the vibration amplitude of the outer peripheral wall 33 on the basis of results of the simulation.

Figure 5:
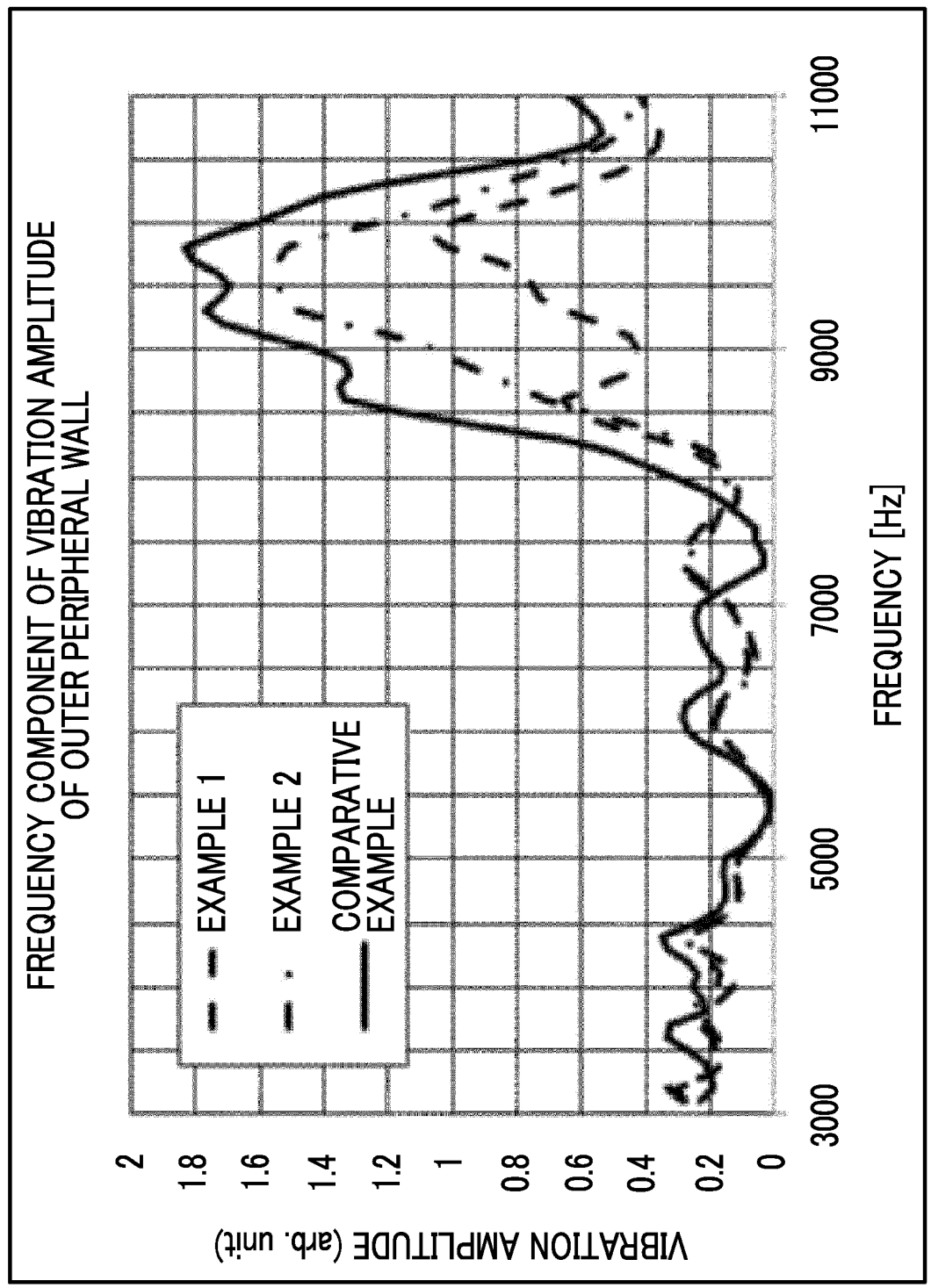
FIG. 5 is a graph showing vibration amplitude of an outer peripheral wall.

The results of the analysis will be described with reference to a graph shown in FIG. 5. The graph is a graph showing the frequency components of the above-mentioned vibration amplitude. A horizontal axis represents a frequency. A vertical axis represents a vibration amplitude. In the comparative example (see a solid line of FIG. 5), there was a tendency that a vibration amplitude was significantly increased in a frequency range of 8000 Hz to 11000 Hz as compared to other frequency ranges. On the other hand, an analysis result that a vibration amplitude in a frequency range of 8000 Hz to 11000 Hz was significantly reduced (was substantially reduced by half or more) as compared to the comparative example was obtained in Example 1 (see a broken line of FIG. 5). That is, it was found in Example 1 that an effect of suppressing the vibration of the outer peripheral wall 33 was significant. Further, an analysis result that a vibration amplitude in the frequency range was generally smaller than a vibration amplitude of the comparative example (was reduced by substantially 20% or more from the vibration amplitude in the comparative example) was also obtained in Example 2 (see a one-dot chain line of FIG. 5). That is, it was also found in Example 2 that an effect of suppressing vibration more significantly than that in the comparative example was obtained.

As described above, in a case where the stator 12 is vibrated, the second portion 21b is deformed and functions as a weak spring element, so that the transmission of vibration to the inner peripheral wall 32 of the housing 3 can be suppressed. Accordingly, the transmission of vibration to the outer peripheral wall 33 of the housing 3 through the partition wall portion 37 can be suppressed. Therefore, even in a case where the inner peripheral wall 32 and the outer peripheral wall 33 of the housing 3 are connected to each other by the partition wall portion 37, the transmission of the vibration of the stator 12 to the outer peripheral wall 33 can be suppressed.

Further, since the central portion of the second portion 21b in the circumferential direction is farthest from the positions at which the teeth 22 are provided, the central portion of the second portion 21b in the circumferential direction has the lowest stiffness and is most likely to be deformed. For this reason, particularly, in a case where the partition wall portion 37 faces the central portion in the radial direction, an anti-vibration function obtained from the second portion 21b can be most effectively exhibited. Accordingly, the transmission of vibration to the outer peripheral wall 33 through the partition wall portion 37 can be effectively suppressed.

Next, a modification example in which the embodiment is modified will be described. Here, components having the same configuration as those of the above-mentioned embodiment will be denoted by the same reference numerals as those of the above-mentioned embodiment, and the description thereof will be appropriately omitted.

(1) The number of the teeth 22 of the stator 12 has been six and three-phase alternating current has flowed through the coils in the above-mentioned embodiment, but the present invention is not limited thereto. The number of the teeth 22 may not be six. Further, current (for example, single-phase alternating current) other than three-phase alternating current may flow through the coils. Furthermore, the teeth 22 do not necessarily need to be arranged at regular intervals in the circumferential direction. That is, the sizes of the plurality of second portions 21b in the circumferential direction may be different from each other. In this case, the partition wall portion 37 may be disposed to be inside the second portion 21b, which has the lowest stiffness (for example, longest in the circumferential direction) among the plurality of second portions 21b, in the circumferential direction. Further, all the teeth 22 do not necessarily need to have the same size.

(2) The motor 2 has been an AC motor in the above-mentioned embodiment, but is not limited thereto. The present invention may be applied to a DC motor.

(3) The rotary electrical machine 1 and the like include the motor 2 for rotating the rotating shaft 13 in the above-mentioned embodiment, but are not limited thereto. For example, a generator that generates an electromotive force on coils by electromagnetic induction in a case where the rotating shaft 13 is rotated via an external force may be provided instead of the motor 2. Alternatively, the motor 2 may be used as a generator. A magnetic force is intermittently generated between the rotor 11 and the teeth 22 even in such a case, so that the stator 12 is vibrated. Accordingly, it is effective that the partition wall portion 37 is disposed to face the second portion 21b in the radial direction.

REFERENCE SIGNS LIST

1: rotary electrical machine
3: housing
11: rotor
12: stator
12a: outer peripheral surface
21: yoke portion
21a: first portion
21b: second portion
22: tooth
30: flow passage portion
31: refrigerant flow passage
32: inner peripheral wall
33: outer peripheral wall
37: partition wall portion

The invention claimed is:
1. A rotary electrical machine comprising:
a rotor that is rotatable using a predetermined axial direction as a direction of an axis of rotation;
a stator that is disposed outside the rotor in a radial direction of the rotor; and
a housing which includes a flow passage portion, in which a refrigerant flows, is formed and in which the rotor and the stator are housed with one axial end open and the other end closed,
wherein the flow passage portion includes an inner peripheral wall that is in contact with an outer peripheral surface of the stator, an outer peripheral wall that is disposed outside the inner peripheral wall in the radial direction and that is provided to form the flow passage portion between the outer peripheral wall and the inner peripheral wall, a bottom portion that is provided at the other end of the housing in the axial direction so as to be disposed on the other axial side of the rotor and the stator, and connects the inner peripheral wall and the outer peripheral wall in the radial direction, and a partition wall portion that is provided at a part in a circumferential direction orthogonal to both the axial direction and the radial direction and that connects the inner peripheral wall to the outer peripheral wall in the radial direction,
the flow passage portion is such that a length in the axial direction is longer than a length in the axial direction of the stator over the entire circumferential direction,
a lid member is fixed to one end of the housing in the axial direction, so that the rotor and the stator are housed inside the housing, and the flow passage portion is sealed,
the stator includes a tubular yoke portion, and a plurality of teeth which are arranged side by side in the circumferential direction and which extend inward from the yoke portion in the radial direction,
the yoke portion includes first portions that are connected to the respective teeth, and second portions which are each disposed between two first portions adjacent to each other in the circumferential direction, and the partition wall portion faces the second portion in the radial direction.

2. The rotary electrical machine according to claim 1, wherein the flow passage portion has one end in the axial direction located on one side of the one end in the axial direction of the stator, and the other end in the axial direction located on the other side of the other end in the axial direction of the stator.

3. The rotary electrical machine according to claim 1, wherein the partition wall portion and a center of the second portion in the circumferential direction face each other in the radial direction.

4. The rotary electrical machine according to claim 2, wherein the partition wall portion and a center of the second portion in the circumferential direction face each other in the radial direction.

* * * * *